United States Patent
Kim et al.

(10) Patent No.: US 9,413,221 B1
(45) Date of Patent: Aug. 9, 2016

(54) POWER CONVERSION USING A SERIES OF POWER CONVERTERS

(71) Applicant: Google Inc., Mountain View, CA (US)

(72) Inventors: Sangsun Kim, San Jose, CA (US); Di Xu, Sunnyvale, CA (US); Anand Ramesh, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 130 days.

(21) Appl. No.: 14/096,676

(22) Filed: Dec. 4, 2013

(51) Int. Cl.
*H02M 5/45* (2006.01)
*H02M 1/32* (2007.01)
*H02M 5/458* (2006.01)

(52) U.S. Cl.
CPC ............. *H02M 1/32* (2013.01); *H02M 5/4585* (2013.01)

(58) Field of Classification Search
CPC ....... H02M 3/22; H02M 3/285; H02M 3/325; H02M 3/335; H02M 3/33507; H02M 3/33515; H02M 3/33523; H02M 3/3353; H02M 3/33561; H02M 3/33569; H02M 3/33576; H02M 3/33584; H02M 3/33592; H02M 3/3376; H02M 3/3374; H02M 3/3372; H02M 3/3378; H02M 5/44; H02M 5/453; H02M 5/458; H02M 5/4585; H02M 5/4505; H02M 7/7575; H02M 7/5387; H02M 7/537; H02M 7/53835; H02M 7/53806
USPC ............ 363/17, 24–26, 34–37, 53, 55, 56.01, 363/56.02, 56.05–56.08, 123, 125–127, 363/131–134
See application file for complete search history.

(56) References Cited

U.S. PATENT DOCUMENTS

| | | | | |
|---|---|---|---|---|
| 4,833,586 A | | 5/1989 | Inaba | |
| 5,245,520 A | * | 9/1993 | Imbertson | H02M 3/337 363/132 |
| 8,729,818 B2 | * | 5/2014 | Zhang | H02M 3/33561 315/185 S |
| 2008/0089099 A1 | * | 4/2008 | Yang | H02M 7/53871 363/17 |
| 2008/0198637 A1 | * | 8/2008 | Meysenc | H02M 7/219 363/67 |
| 2011/0205768 A1 | | 8/2011 | Svensson | |
| 2012/0175962 A1 | * | 7/2012 | Zhan | H02J 1/102 307/82 |
| 2013/0051082 A1 | * | 2/2013 | Lee | H02M 3/285 363/17 |
| 2013/0119970 A1 | | 5/2013 | Trainer | |
| 2014/0140104 A1 | * | 5/2014 | Norrga | H02J 3/36 363/17 |
| 2015/0015072 A1 | * | 1/2015 | Deboy | H02M 7/537 307/52 |

FOREIGN PATENT DOCUMENTS

WO WO2013102784 A8 11/2013

* cited by examiner

*Primary Examiner* — Gary L Laxton
*Assistant Examiner* — Kevin H Sprenger
(74) *Attorney, Agent, or Firm* — Fish & Richardson P.C.

(57) ABSTRACT

A power conversion unit includes power converters arranged sequentially to each other to convert input power that is provided at an input of the power conversion unit to output power. A set of first capacitors are arranged in series with each other and include, for each power converter, a first capacitor that is arranged in parallel with an associated power converter. Each first capacitor is also arranged to store a portion of the input power. A set of second capacitors are connected in series with each other and include a second capacitor connected between each pair of sequential power converters in the sequence. The set of second capacitors are arranged to balance the portion of the input power stored by each first capacitor.

17 Claims, 10 Drawing Sheets

POWER CONVERSION USING A SERIES OF POWER CONVERTERS

TECHNICAL FIELD

This document relates to power converters.

BACKGROUND

Electric power, particularly for relatively high-power applications, is frequently generated as high voltage AC power (above about 35 KV) at a utility, and distributed through an electric grid as such. The high voltage is then stepped down to medium voltage (between about 1 KV and about 35 KV), such as at electrical substations. The medium voltage power may be provided to primary customers, or may be stepped down again to low voltage (below about 1 KV, such as, for example, 120V or 240V) for provision to secondary customers (e.g., home owners).

Computer data centers are a large consumer of electric power. Such data centers may include hundreds or thousands of computer server systems and associated networking equipment, along with support equipment such as HVAC, lighting, and other such equipment that consumes electric power. Electric power thus needs to be provided to a computer data center at appropriate voltages and in an efficient manner because such data centers can operate 24/7 so that efficiency is at a premium.

SUMMARY

The present disclosure describes systems and methods for processing electric power using power converters arranged in a chain-link or in a sequential configuration. For example, less expensive medium voltage power conversion can be performed by providing a series of lower voltage power converters that each adjust the voltage level of a portion of the input power or adjust the frequency of a portion of input AC power (e.g., increasing the frequency such that the operational frequency of isolation transformers connected to the output of the power converters can be increased). To protect such converters, capacitors or other similar devices may be used to balance the voltage level provided to the input of each power converter (e.g., with one input capacitor tied to each converter), with all of the capacitors tied together in series. By this approach, less expensive lower voltage power converters can be used to convert input voltages that exceed the voltage rating of the power converters.

In certain examples described herein, a power conversion unit includes two or more power converters arranged sequentially relative to each other to convert input power provided at an input of the power converter unit to an output power; a set of first capacitors arranged in series with each other and including for each power converter a first capacitor that is arranged in parallel with an associated power converter and being arranged to store a portion of the input power; and a set of second capacitors arranged in series with each other and including a second capacitor connected between each pair of sequential power converters in the sequence, the set of second capacitors being arranged to balance the portion of the input power stored by each first capacitor.

These and other embodiments can each optionally include one or more of the following features. In some aspects, the set of second capacitors can be arranged to balance a voltage level for each first capacitor. Each power converter can be arranged to convert the portion of the input power stored by the first capacitor that is arranged in parallel with the power converter into a portion of the output power.

In some aspects, the second capacitor that is connected between a particular pair of sequential power converters can be arranged to balance the portion of the input power that is stored by the first capacitors for the particular pair of sequential power converters. Each particular power converter of the particular pair of sequential power converters can include a set of switches that are arranged to switch the second capacitor connected between the particular pair of power converters between a first position and a second position. In the first position, the second capacitor is in parallel with the first capacitor for a first power converter of the particular pair of sequential power converters. In the second position, the second capacitor is in parallel with the first capacitor for a second power converter of the particular pair of sequential power converters.

In some aspects, a controller can be arranged to adjust the switches such that the second capacitor is switched from the first position to the second position at a particular frequency. The switches can include semiconductor switches.

In other aspects, each second capacitor can be arranged as a flying capacitor. The two or more power converters can be arranged to convert the input power to output power by switching at a frequency higher than a frequency of the input power or adjusting a voltage level of the input power. Each power converter can include a half-bridge or full-bridge power converter.

In yet other aspects, a power conversion unit can include a set of transformers. The set of transformers can include a transformer that has an input that is electrically coupled to the output of each power converter. Particular transformers of the set of transformers can share a same magnetic core. Power converters can be connected to the outputs of the transformers. The number of power converters in the set of power converters may not equal the number of power converters of the two or more power converters. The number of power converters in the set of power converters may equal the number of power converters of the two or more power converters.

In additional aspects, the portion of input power stored by each first capacitor is arranged to be balanced by open loop control or closed loop control. The two or more power converters and the set of first capacitors can include at least one redundant stage that includes a power converter and a first capacitor. The at least one redundant stage can be arranged to maintain, at each input capacitor, a balanced voltage that is less than a rated voltage for the power converters in response to a failure of at least one of the input capacitors or at least one of the power converters.

In some aspects, a method for converting power includes storing, by a set of first capacitors, input power received from an input power source, each first capacitor storing a portion of the input power; converting the input power using two or more power converters, each power converter converting a portion of the input power stored by a corresponding first capacitor that is arranged in parallel with the power converter; and balancing, by a set of second capacitors, the portion of the input power stored by each first capacitor.

Aspects can include switching each second capacitor between a first position in which the second capacitor is arranged in parallel with a particular first capacitor and a second position in which the second capacitor is arranged in parallel with a second capacitor different than the particular second capacitor. Aspects can include switching each second capacitor between the first position and the second position using switches of the two or more power converters.

Aspects can also include transforming converted power output by each power converter using a set of transformers. Each transformer of the set of transformers can include a common magnetic core. Each power converter can adjust a voltage of a portion of the input power and adjusts an operational frequency of an isolation transformer.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
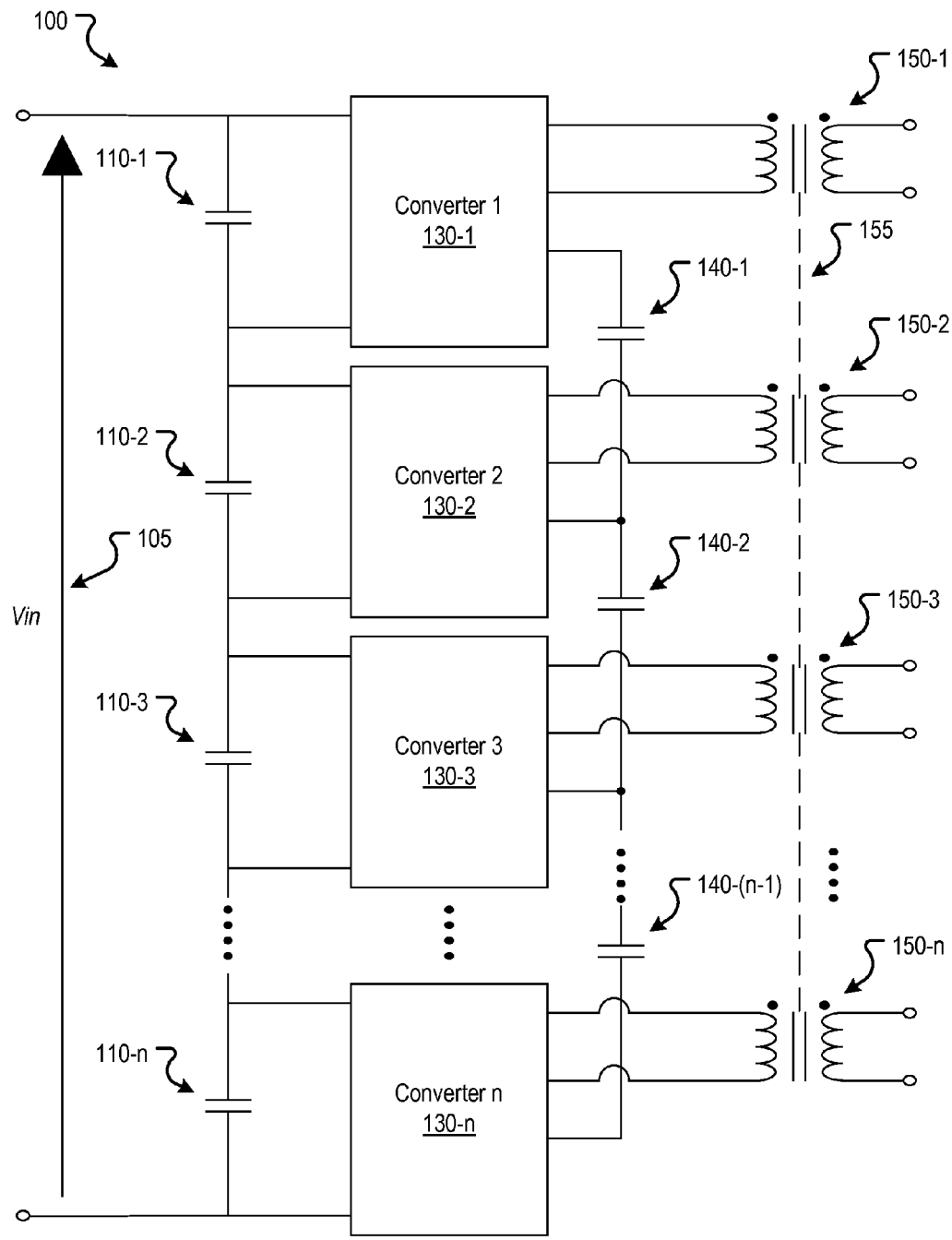
FIG. 1 is a schematic diagram of a power conversion unit having power converters arranged in a sequence, capacitors for balancing input voltage to the power converters, and transformers connected to outputs of the power converters.

This description discusses systems and techniques for distributing and converting power, for example, in a computer data center or other facility. Power converters capable of converting power at higher voltage levels, such as at medium voltage levels (e.g., between about 1 KV and about 35 KV), are generally expensive compared to power converters capable of converting power at lower voltages, such as low voltages (e.g., less than 1 KV). To reduce this expense, power conversion units described herein can include a sequence of lower voltage power converters, each for converting a portion of the input power. Each power converter may adjust the voltage level of a portion of the input power and/or adjust the frequency of a portion of input AC power. For example, each power converter may increase the frequency of a portion of the input AC power such that an isolation transformer that has an operational frequency that exceeds the frequency of the input AC power can be used to transform the converted portion of input AC power.

Capacitors, or other energy storage devices, can be used to balance the voltage level of the input power for each such power converter. If the voltage levels are not balanced and the power converters are not rated for the voltage level of the input power, the voltage level at one of the power converters may exceed its tolerable voltage level, thus causing the power converter to fail. Each power converter can have an input capacitor (also called a first capacitor herein) electrically coupled to its input. These input capacitors, across the multiple power converters, can be connected in series with each other and the series-connected input capacitors can be arranged across the input power source. Each input capacitor can store and provide a portion of the input power to its respective power converter. In appropriate arrangements, multiple capacitors of an appropriate size (either a common size or different sizes) can be provided in place of a single capacitor (or other energy storage device) on each input.

A second set of capacitors can be used to balance the voltage levels (e.g., cause the voltage levels to be approximately equal to each other) of the input capacitors, and thus balance the input power to the power converters. The second set of capacitors can also be used to balance a portion of the input power stored by each input capacitor. These second capacitors can be arranged as flying capacitors that are connected between each pair of sequential power converters. A flying capacitor connected between two sequential power converters can balance the voltage level of the input of the two power converters.

In a first position, a flying capacitor can be connected in parallel with the input capacitor of a first power converter of the pair of sequential power converters, and not in parallel with the input capacitor of the second power converter of the pair of sequential power converters. In this first position, the voltage level of the flying capacitor and the voltage level of the input capacitor for the first power converter will tend to become balanced, or approximately equal to each other. In a second position, the flying capacitor can be connected in parallel with the input capacitor of the second power converter and not in parallel with the input capacitor of the first power converter. In this second position, the voltage level of the flying capacitor and the voltage level of the input capacitor for the second power converter will tend to become balanced, or approximately equal to each other. A controller (e.g., microcontroller) may operate switches to switch between the first and second positions such that the exchange of electrical energy between the capacitors causes the voltage levels of the input capacitors to become balanced, or approximately equal to each other.

FIG. 1 is a schematic diagram of an example power conversion unit 100 having power converters 130-1-130-$n$ arranged in a sequence, capacitors 110-1-110-$n$ and 140-1-140($n$−1) for balancing input voltage to the power converters 130-1-130-$n$, and transformers 150-1-150-$n$ connected to outputs of the power converters 130-1-130-n. The power converters 130-1-130-n and capacitors 110-1-110-n and 140-1-140(n−1) can be considered part of a primary stage, while the transformers 150-1-150-n may be considered part of a transformer stage. As discussed in more detail below, a secondary stage may be connected to the secondary windings of the transformers 150-1-150-n for further power conversion and signal processing.

The power converters 130-1-130-n are connected in a sequence and can include a number "n" of power converters 130-1-130-n. Each particular power converter 130 can include a half-bridge power converter, a full-wave power converter, or another type of power converter. The components of the power converters 130-1-130-n 130 can also vary. For example, each power converter 130 may include unidirectional switches, bi-directional switches, or a combination of switches and capacitors, as described in more detail below. Regardless of the configuration, each power converter 130 in the sequence can convert at least a portion of power provided by an input power source 105. For example, each power converter 130 can adjust the voltage (e.g., increase or decrease) and/or increase the frequency of a portion of the input power. As described in more detail below, the input power source may be direct current (DC) power or alternating current (AC) power.

The capacitors 110-1-110-n constitute a first set of capacitors and are arranged in series with each other. The first set of capacitors 110-1-110-n is also connected in series and across the input power source 105. The example power conversion unit 100 includes a capacitor 110 for each power converter in the sequence of power converters 130. For example, the power conversion unit 100 includes a capacitor 110-1 for power converter 130-1, a capacitor 110-2 for power converter 130-2, and so on. For ease of subsequent discussion, the capacitors 110-1-110-n are referred to as "input capacitors" although the capacitors are not required to be connected directly to an input.

Each input capacitor 110 provides a portion of the input power (e.g., from the input power source 105) to its respective power converter 130. For example, the input capacitor 110-1 can store and provide a portion of the input power as an input to the power converter 130-1. This arrangement allows for the use of power converters that are rated, or otherwise capable of, converting electrical power of a particular voltage level, to convert input power of higher voltage levels than the particular voltage level. For example, the power conversion unit 100 may convert medium voltage power (e.g., between about 1 KV and about 35 KV) using power converters 130 rated for low voltage use (e.g., below about 1 KV, such as 120V).

A second set of capacitors 140-1-140-(n−1) are used to balance the voltage levels of the input capacitors 110-1-110-n, and thus the voltage level of the portion of the power provided to each power converter 130-1-130-n. For ease of discussion, the capacitors 140 are referred to herein as "flying capacitors." The example power unit 100 includes a flying capacitor 140 for each pair of sequential power converters 130. For example, a flying capacitor 140-1 is connected between sequential power converters 130-1 and 130-2; a second capacitor 140-2 is connected between sequential power converters 130-2 and 130-3, and so on.

Each flying capacitor 140 is arranged such that the particular flying capacitor 140 can be switched between a first position or arrangement in which the flying capacitor 140 is in parallel with an input capacitor for one of its corresponding sequential power converters, and a second position or arrangement in which the flying capacitor 140 is in parallel with an input capacitor for its other corresponding sequential power converter. For example, the flying capacitor 140-1 may be switched between a position in which the flying capacitor is in parallel with input capacitor 110-1 and another position in which the flying capacitor is in parallel with input capacitor 110-2. As described in more detail below, a controller (not shown) can control switches of the power converters 130 to selectively switch the position of the flying capacitors 140.

To illustrate how the voltage balancing can operate, consider the input capacitors 110-1 and 110-2, and the flying capacitor 140-1. When the flying capacitor 140-1 is in parallel with the input capacitor 110-1, the voltage levels of these two capacitors (and the amount of electrical energy stored by each of the two capacitors) tend to become balanced. If the voltage of one of the capacitors is higher than that of the other capacitor, then the capacitor having the higher voltage level discharges electrical energy to the capacitor having the lower voltage level, thereby charging the capacitor having the lower voltage level. For example, if the voltage level of input capacitor 110-1 is higher than the voltage level of flying capacitor 140-1 while the two capacitors are in parallel, the input capacitor 110-1 discharges electrical energy to the flying capacitor 140-1. If the position of the flying capacitor 140-1 is switched such that it is in parallel with input capacitor 110-2, then voltage level of the flying capacitor 140-1 and the voltage level of the input capacitor 110-2 tend to become balanced. For example, if the flying capacitor 140-1 is at a higher voltage level than the voltage level of the input capacitor 110-2 (e.g., due to the energy received from the input capacitor 110-1), then the flying capacitor 140-1 discharges electrical energy to the input capacitor 110-2.

By switching the flying capacitor 140-1 between the two positions, the flying capacitor 140-1 can balance the voltage levels of the input capacitors 110-1 and 110-2. Similarly, the flying capacitor 140-2 can balance the voltage levels of input capacitors 110-2 and 110-3. Each flying capacitor 140 in the second set of capacitors can balance the voltage levels of its respective input capacitors 130 such that the voltage levels of the input capacitors 130 are balanced, or approximately equal. In this manner, the voltage levels of the flying capacitors 140 also become balanced with each other and with the voltage levels of the input capacitors 110.

A controller, such as an IC microcontroller or other type of controller, can switch the position of the flying capacitors 140 using switches of the power converters 130, as described in detail below. The controller can switch the position of the flying capacitors using open loop control as the capacitors 110 and 140 naturally become balanced due to the switching between parallel positions. Thus, a feedback signal is not required by the controller to balance the voltages. In some implementations, the controller can switch the position using closed loop control. For example, the controller may receive data indicating the voltage levels of the input capacitors and adjust the switching based on the voltage levels.

The output of each power converter 130-1-130-n is connected to a corresponding transformer 150-1 to 150-n. Each transformer 150-1-150-n can include a solid state transformer or another type of transformer. The transformers 150-1 to 150-n can be step-up transformers to increase the voltage on the secondary sides of the transformers relative to the voltage on the primary sides, step-down transformers to reduce the voltage levels on the secondary sides of the transformers relative to the voltage on the primary sides, or isolation transformers that do not substantially change the voltage levels. As shown in FIG. 1, the transformers 150-1-150-n can share a common magnetic core 155. For example, the transformers 150-1-150-n may share a toroid core. In some implementations, the transformers 150-1-150-*n* do not share a common magnetic core, and instead may be independent, discrete transformers.

The secondary sides of the transformers 150-1-150-*n* can be connected to a load or to additional circuit elements that are connected to a load. For example, the secondary sides of the transformers 150-1-150-*n* may be connected to one or more rectifiers, power factor correctors, boost converters, and/or one or more power converters, as described in more detail below.

The number of power converter stages "n" (e.g., a power converter stage may include a power converter and its corresponding input capacitor) can be selected based on the input voltage level and the voltage rating of the power converters. For example, the number of power converter stages may be selected such that, when the voltage is balanced on the input capacitors 110-1-110-*n*, the voltage of the input capacitors 110-1-110-*n* are less than the voltage rating of the power converters 130-1-130-*n*. The power conversion unit 100, and the power conversion units described below, can include redundancy in the power converter stages. For example, the power conversion unit 100 may include extra or redundant power converter stages such that, if one or more input capacitors 110-1-110-*n* and/or one or more power converter stages fail, the input capacitors of the remaining power converter stages can balance the input voltage at a voltage level that is below the rated voltage level for the remaining power converters 130-1-130-*n*. In some implementations, a power conversion unit may have N-M redundancy, where there are "N" power converter stages and can maintain input voltage levels below the rated voltage level of the power converters when up to "M" power converter stages fail. In the event that more than M power converter stages fail, the power conversion unit 100 may shut down to protect the power converters.

Figure 2:
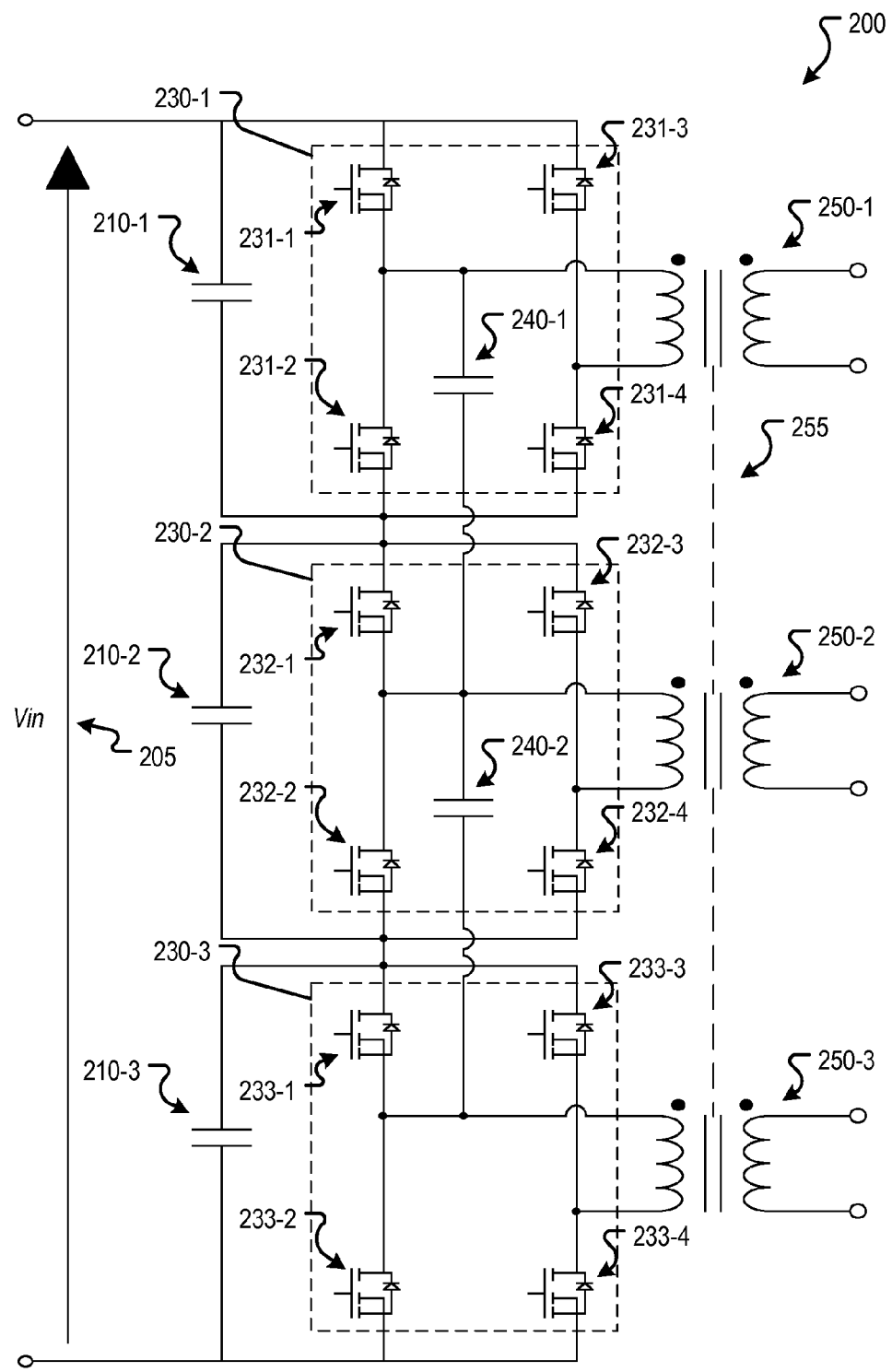
FIG. 2 is a schematic diagram of another power conversion unit having power converters arranged in a sequence, capacitors for balancing input voltage to the power converters, and transformers connected to outputs of the power converters.

FIG. 2 is a schematic diagram of another example power conversion unit 200 having power converters 230-1-230-3 arranged in a sequence, input capacitors 210-1-210-3, flying capacitors 240-1 and 240-2, and transformers 250-1-250-3 connected to outputs of the power converters 230-1-230-3. Although the example power conversion unit 200 includes three power converters 230, the power conversion unit can include other numbers of power converters 230, such as five, ten, twenty, or some other number.

An input power source 205 is connected across input capacitors 210. The input power source 205 may be a DC power source of various appropriate forms, including rectified DC power from a rectifier unit. The power is DC power, and is passed as such to the input capacitors 210-1 to 210-3.

The power converters 230-1-230-3 are arranged in a sequence, similar to the power converters 130-1-130-*n* of FIG. 1. The power conversion unit 200 includes an input capacitor 210 for each power converter 230 and a flying capacitor 240 connected between each sequential pair of power converters 230. For example, the power conversion unit 200 includes an input capacitor 210-1 for power converter 230-1 and has a flying capacitor 240-1 connected between sequential power converters 230-1 and 230-2. Similarly, the power conversion unit 200 includes an input capacitor 210-2 for power converter 230-2 and has a flying capacitor 240-2 connected between sequential power converters 230-2 and 230-3. Also, like in FIG. 1, the input capacitors 210 are connected in series with each other and across the input power source 205. Similarly, the flying capacitors 240 are connected in series with each other.

Each power converter 230 is arranged as a full-wave bridge power converter and each power converter 230 includes two pairs of switches. For example, the power converter 230-1 includes a first pair of switches 231-1 and 231-2, and a second pair of switches 231-3 and 231-4; the power converter 230-2 includes a first pair of switches 232-1 and 232-2 and a second pair of switches 232-3 and 232-4; the power converter 230-3 includes a first pair of switches 233-1 and 233-2 and a second pair of switches 233-3 and 233-4. Each pair of switches is arranged as a bi-directional switch. That is, the switches 231-1 and 231-2 form a bi-directional switch and the switches 231-3 and 231-4 form a bi-directional switch. In this example implementation, the switches of each power converter 230 are metal-oxide-semiconductor field-effect transistors ("MOSFETs") switches. In some implementations, other types of switches may be used to form the bi-directional switches, such as isolated-gate bipolar transistors ("IGBTs") or other appropriate forms of a switch. Each of the switches may be controlled using a controller, such as an IC microcontroller.

As described in more detail below, the switches of the power converters 230 can be used to adjust the frequency for transformers 250 connected to the outputs of the power converters 230. For example, such switching can increase the frequency of the input AC signal, which may be at 50 Hz or 60 Hz, by a factor of about 30, 50, 100, 150, or 200 (e.g., to 10 kHz), or a factor in the range between any of those values (e.g., a factor between 100 and 200). The higher frequency may be in the range of 1 kHz to 100 kHz, or more specifically, in ranges of 1 kHz to 5 kHz, 1 kHz to 10 kHz, 5 kHz to 10 kHz, 10 kHz to 25 kHz, or 25-50 kHz. This allows for the use of transformers 250 that have an operational frequency in one of the aforementioned frequency ranges (or another frequency range). Such higher frequency transformers may be less bulky and/or less expensive than transformers having an operation frequency that is lower, such as those having an operational frequency of 50 Hz or 60 Hz.

The first pair of switches (e.g., switches 231-1 and 231-2) of the power converters 230 is used to switch the position of the flying capacitors 240. That is, the first pair of switches can selectively switch each flying capacitor 240 between a first position in which the flying capacitor is in parallel with a particular input capacitor, and a second position in which the flying capacitor is in parallel with another input capacitor different from the particular input capacitor. As described above, this switching enables the flying capacitors 240 to balance the voltage levels of the input capacitors 210, and thus the voltage levels for each power converter 230.

To illustrate this switching operation, consider the switches 231-1 and 231-2 of the power converter 230-1, the switches 232-1 and 232-2 of the power converter 230-2, and the flying capacitor 240-1. When the switches 231-1 and 232-1 are active (e.g., allowing current to flow through each of the switches) and the switches 231-2 and 232-2 are inactive (e.g., blocking current flow through each of the switches), the flying capacitor 240-1 is in parallel with the input capacitor 210-1 for the power converter 230-1. When the switches 231-2 and 232-2 are active (e.g., allowing current to flow through each of the switches) and the switches 231-1 and 232-1 are inactive (e.g., blocking current flow through each of the switches), the flying capacitor 240-1 is in parallel with the input capacitor 210-2 for the power converter 230-2.

A controller can switch the first pair of switches of each power converter 230 in a complementary manner such that when the first switch (i.e., the switch with a "−1" reference numeral) is active, the second switch (i.e., the switch with a "−2" reference numeral) is inactive. In addition, the controller can switch the first pair of switches of each power converter 230 such that the first switches of each power converter 230 are in the same mode of operation (e.g., active or inactive) and such that the second switches of each power converter 230 are the same mode of operation. For example, in a first position, the controller may activate the switches 231-1, 232-1, and 233-1, while deactivating the switches 231-2, 232-2, and 233-2. In this first position, the flying capacitor 240-1 is in parallel with the input capacitor 210-1 and the flying capacitor 240-2 is in parallel with the input capacitor 210-2. Thus, the voltage level of the flying capacitor 240-1 and the voltage level of the input capacitor 210-1 tend to become balanced and the voltage level of the flying capacitor 240-2 and the voltage level of the input capacitor 210-2 tend to become balanced.

In a second position, the controller may activate the switches 231-2, 232-2, and 233-2, while deactivating the switches 231-1, 232-1, and 233-1. In this second position, the flying capacitor 240-1 is in parallel with the input capacitor 210-2 and the flying capacitor 240-2 is in parallel with the input capacitor 210-3. Thus, the voltage level of the flying capacitor 240-1 and the voltage level of the input capacitor 210-2 tend to become balanced and the voltage level of the flying capacitor 240-2 and the voltage level of the input capacitor 210-3 tend to become balanced.

The controller can switch the switches between the first and second positions to balance the voltages on each of the input capacitors 210. This controller can switch between the first and second positions at a higher frequency than the AC input power frequency so that the voltages become balanced within milliseconds or microseconds. For example, the controller can switch from the first and second position at a frequency of about 10 kHz, 100 kHz, a frequency between 10 kHz and 100 kHz, or some other frequency, enabling the voltages to become balanced in milliseconds or microseconds.

In some implementations, the controller switches the switches between the two switches at a duty cycle of 50%, or about 50%. At a 50% duty cycle, the first switch (i.e., the switch with a "-1" reference numeral) is active for an amount of time equal to the amount of time that the second switch (i.e., the switch with a "-2" reference numeral) is active. For example, the controller may toggle the switches such that the first switches remain active for 10 microseconds, followed by 10 microseconds where the second switches are active.

The controller may also use other duty cycles, such as 40%, 60%, or some other appropriate duty cycle. For example, during startup or during a power surge, the controller may decrease the duty cycle such that the first switches remain active for a shorter period of time than the second switches per cycle. In other appropriate circumstances, the controller may decrease the duty cycle such that the first switches remain active longer than the second switches per cycle.

Each power converter 230 converts (e.g., adjusts the voltage or frequency) the power stored by its corresponding input capacitor 210 and provides the converted power to the primary windings of a transformer 250. For example, the power converter 230-1 converts power stored by the input capacitor 210-1 and provides the converted power to the primary windings of the transformer 250-1. A load can be connected to the secondary windings along with additional circuit elements, as described in more detail below. Similar to the transformers of FIG. 1, the transformers 250 can include a common magnetic core 255.

Figure 3:
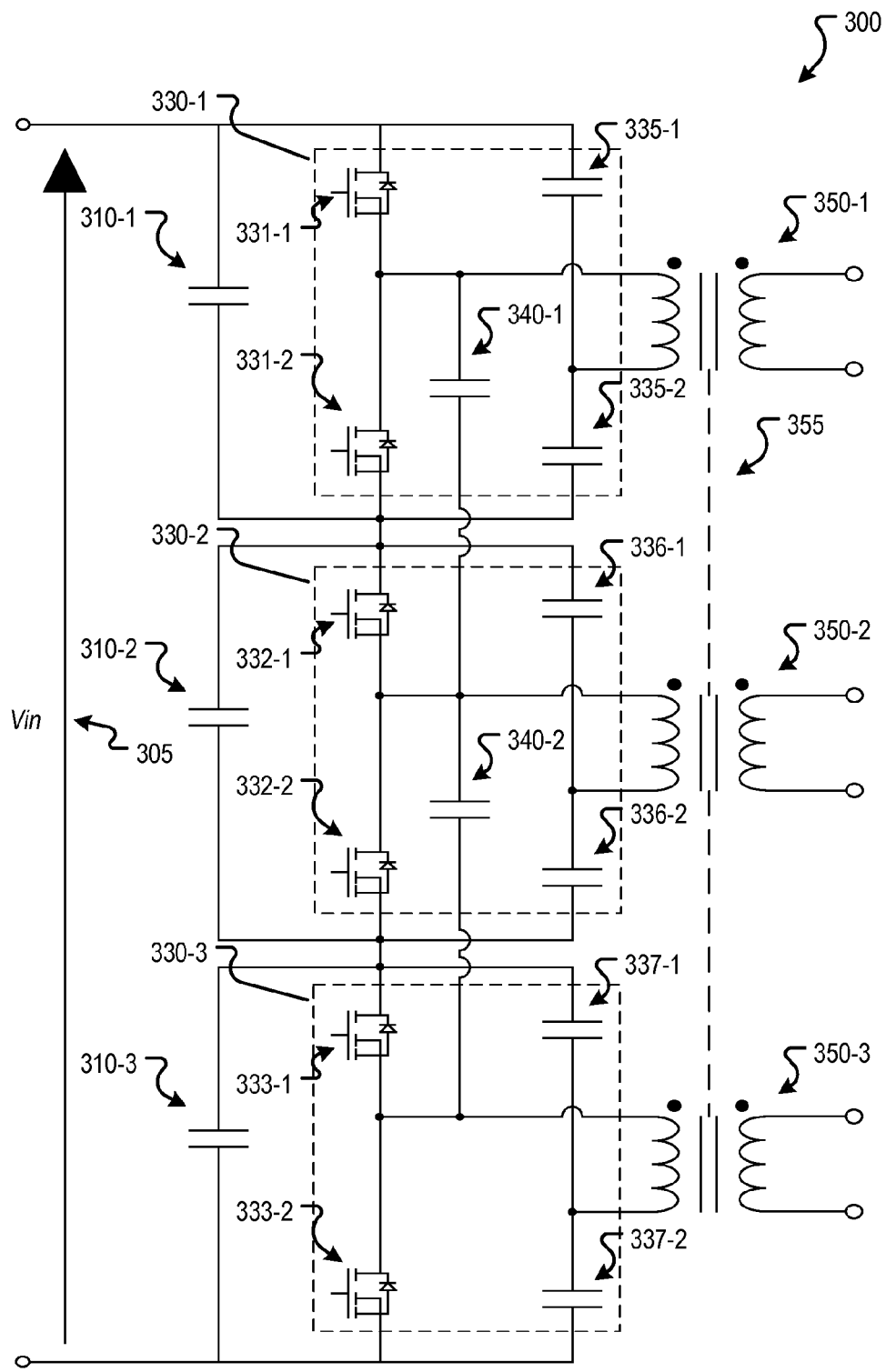
FIG. 3 is a schematic diagram of another power conversion unit having power converters arranged in a sequence, capacitors for balancing input voltage to the power converters, and transformers connected to outputs of the power converters.

FIG. 3 is a schematic diagram of another example power conversion unit 300. The example power conversion unit 300 is similar to the power conversion unit 200 of FIG. 2. For example, the power conversion unit 300 includes input capacitors 310-1-310-3 connected in series and across an input power source 305 (e.g., a DC power source), a sequence of power converters 330-1-330-3 each having a respective input capacitor 310-1-310-3, a flying capacitor 340-1, 340-2 connected between each pair of power converters 330, and transformers 350-1-350-3 (optionally having a common magnetic core 355) connected to the outputs of the power converters 330-1-330-3, respectively.

However, the power converters 330-1-330-3 of the power conversion unit 300 are arranged as half-wave power converters rather than full-wave power converters. Each power converter 330 includes a pair of switches that correspond to the first pair of switches of the power converters 200 of FIG. 2, and a pair of capacitors. In particular, the power converter 330-1 includes a pair of switches 331-1 and 331-2 and capacitors 335-1 and 335-2; the power converter 330-2 includes a pair of switches 332-1 and 332-2 and capacitors 335-3 and 335-4; and the power converter 330-3 includes a pair of switches 333-1 and 333-2 and capacitors 337-1 and 337-2. The pair of switches of each power converter 330 is used to switch the position of the flying capacitors 340-1 and 340-2, similar to that of the power converters 200 of FIG. 2. The half-bridge power converters provide a balance between efficiency and component cost.

Figure 4:
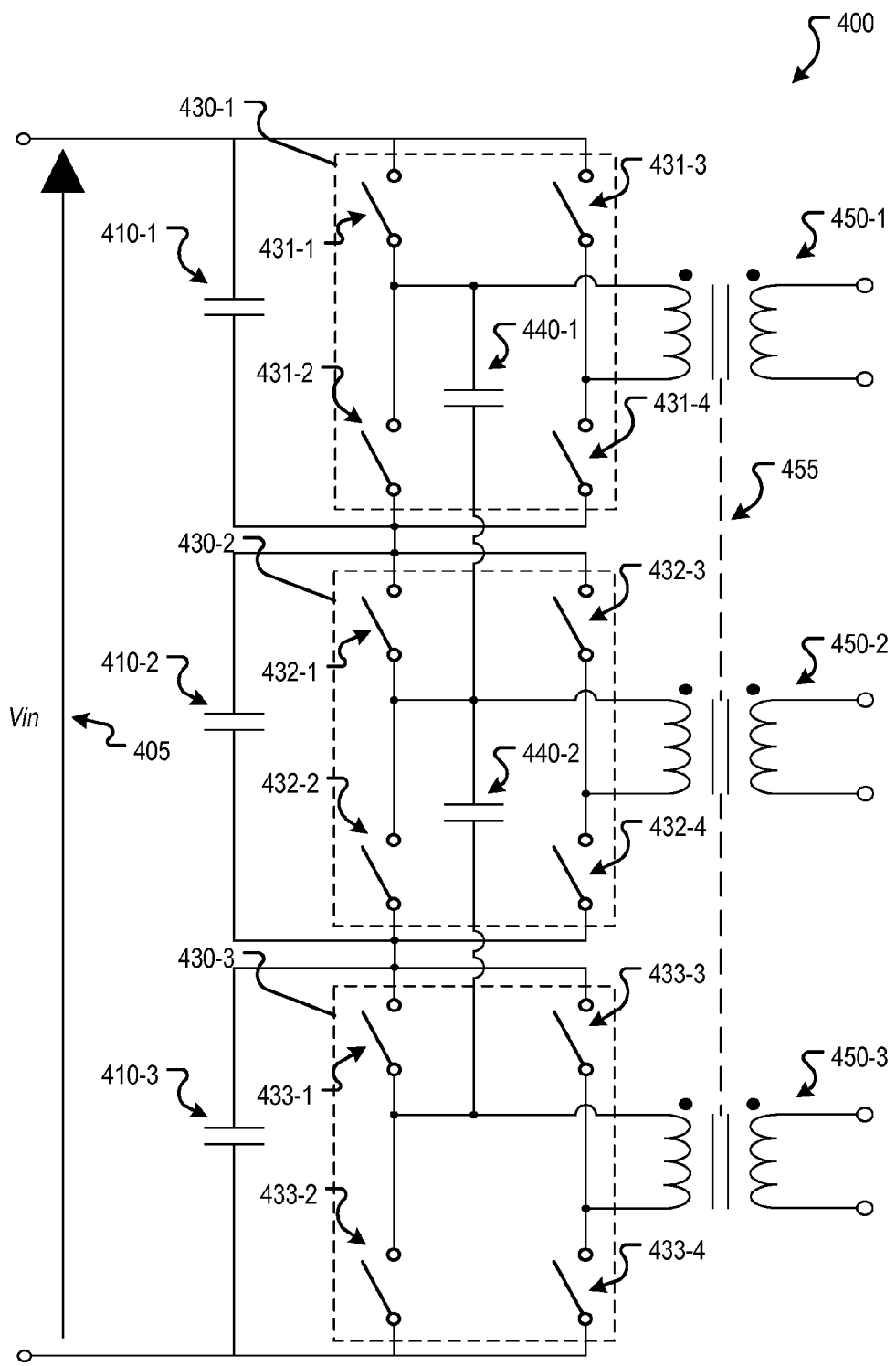
FIG. 4 is a schematic diagram of another power conversion unit having power converters arranged in a sequence, capacitors for balancing input voltage to the power converters, and transformers connected to outputs of the power converters.

FIG. 4 is a schematic diagram of another example power conversion unit 400. The example power conversion unit 400 is also similar to the power conversion unit 200 of FIG. 2. For example, the power conversion unit 400 includes input capacitors 410-1-410-3 connected in series and across an input power source 405 (e.g., an AC power source), a sequence of power converters 430-1-430-3 each having a respective input capacitor 410-1-410-3, a flying capacitor 440-1, 440-2 connected between each pair of power converters 430, and transformers 450-1-450-3 (optionally having a common magnetic core 455) connected to the outputs of the power converters 430-1-430-3, respectively.

The power converters 430 are arranged as full-wave power converters and each power converter 430 includes two pairs of bi-directional switches rather than two pairs of MOSFET switches like the power converters 230 of FIG. 2. In particular, the power converter 430-1 includes a first pair of bi-directional switches 431-1 and 432-2, which correspond to the first pair of switches 231-1 and 231-2 of the power converters 230 of FIG. 2. The power converter 430-1 also includes a second pair of switches 431-3 and 431-4, which corresponds to the second pair of switches 231-3 and 231-4 of the power converter 230 of FIG. 2. Similarly, the power converter 430-2 includes a first pair of switches 432-1 and 432-2 and a second pair of switches 432-3 and 432-4; and the power converter 430-3 includes a first pair of switches 433-1 and 433-2 and a second pair of switches 433-3 and 433-4.

The first pair of switches of each power converter 430 is used to switch the position of the flying capacitors 440-1 and 440-2, similar to that of the power converters 200 of FIG. 2. Each bi-directional switch of the power converters 430 can be implemented in various ways, such as by using two IGBTs or MOSFETs in series (e.g., as in FIG. 2), using a single IGBT or MOSFET, or using a higher number of IGBTs or MOSFETs.

The use of power converters 430-1-430-3 that have bi-directional switches enables the power conversion unit 400 to convert AC input power. For example, the power conversion unit 400 can balance the voltages of the input capacitors 410-1-410-3 and increase the operational frequency of the transformers 450-1-450-3, and provide the converted signal to a load or other circuit elements, as described in more detail below with reference to FIG. 9.

Figure 5:
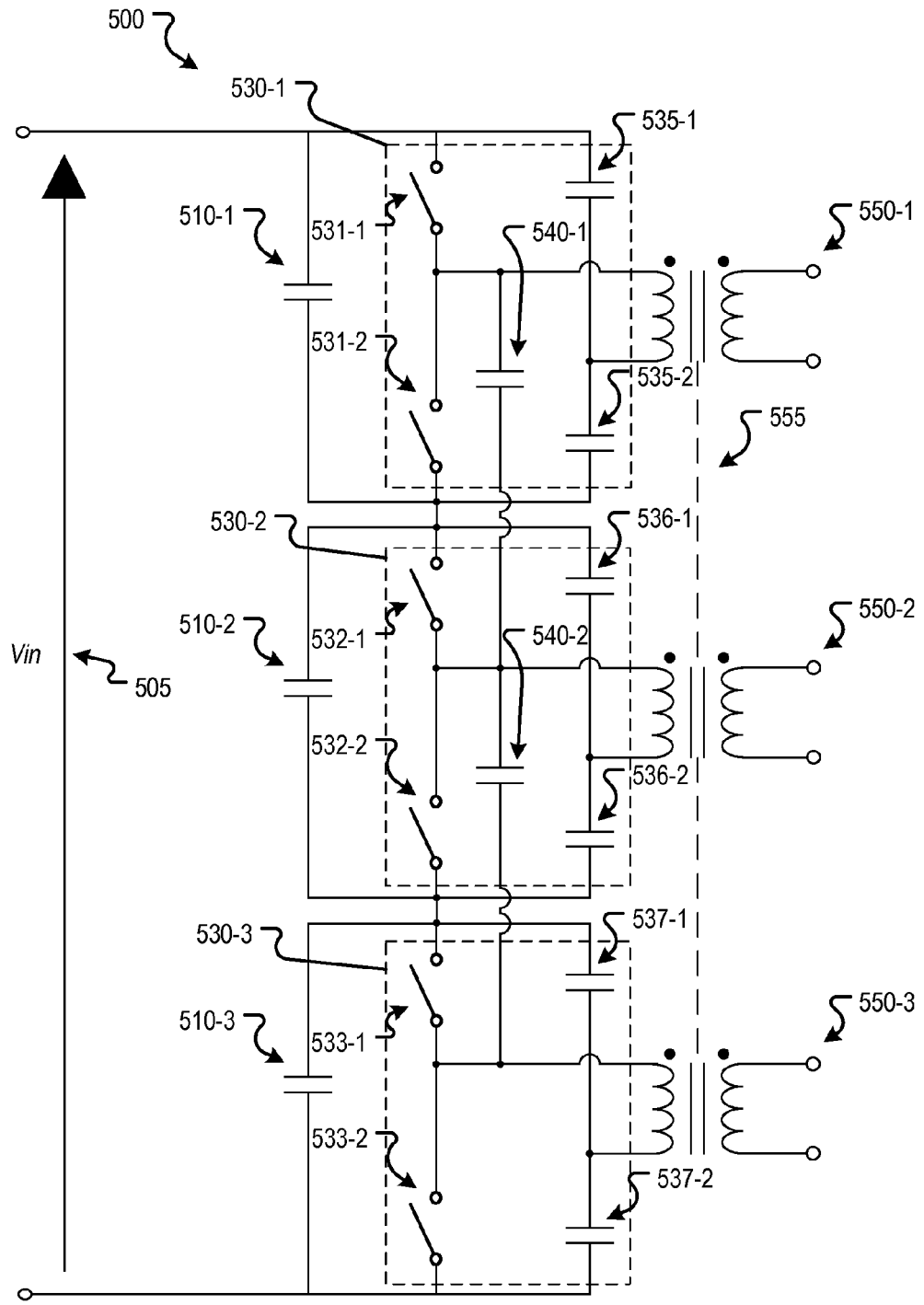
FIG. 5 is a schematic diagram of another power conversion unit having power converters arranged in a sequence, capacitors for balancing input voltage to the power converters, and transformers connected to outputs of the power converters.

FIG. 5 is a schematic diagram of another example power conversion unit 500. The example power conversion unit 500 is similar to the power conversion unit 400 of FIG. 4. For example, the power conversion unit 500 includes input capacitors 510-1-510-3 connected in series and across an input power source 505 (e.g., an AC power source), a sequence of power converters 530-1-530-3 each having a respective input capacitor 510-1-510-3, a flying capacitor 540-1, 540-2 connected between each pair of power converters 530, and transformers 550-1-550-3 (optionally having a common magnetic core 555) connected to the outputs of the power converters 530-1-530-3, respectively.

However, the power converters 530-1-530-3 are arranged as half-wave power converters. Each power converter 530 includes a pair of bi-directional switches that correspond to the first pair of bi-directional switches of the power converters 430 of FIG. 4, and a pair of capacitors. In particular, the power converter 530-1 includes a pair of bi-directional switches 531-1 and 531-2 and a pair of capacitors 535-1 and 535-2; the power converter 530-2 includes a pair of bi-directional switches 532-1 and 532-2 and a pair of capacitors 536-1 and 536-2; and the power converter 530-3 includes a pair of bi-directional switches 533-1 and 533-2 and a pair of capacitors 537-1 and 537-2. As described above, the half-bridge power converters provide a balance between efficiency and component cost.

Figure 6:
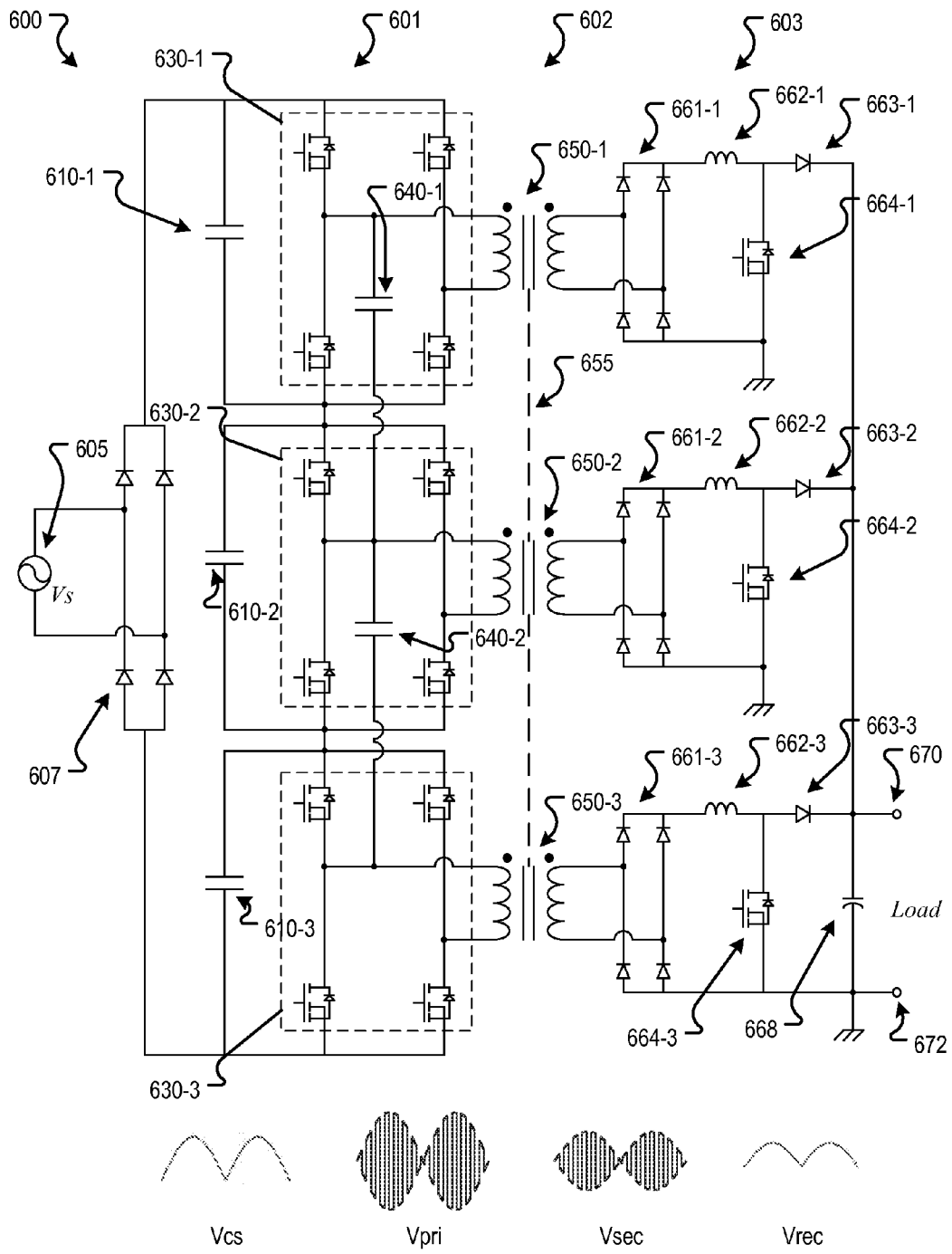
FIG. 6 is a schematic diagram of a power conversion unit having power converters arranged in a sequence, capacitors for balancing input voltage to the power converters, transformers connected to outputs of the power converters, and rectifiers connected to the secondary side of the transformers.

FIG. 6 is a schematic diagram of an example power conversion unit 600 having a primary stage 601, a transformer stage 602, and a secondary stage 603. The primary stage 601 is connected to an AC power source 605. Although the AC power source 605 is shown as an ideal power source, the AC power source 605 may be an AC power source of various appropriate forms, including medium voltage power received from a utility or produced from high voltage power received from a utility. The power is alternating current power and is passed as such to a rectifier unit 607 of the primary stage 601. The rectifier unit 607 produces a rectified signal from the AC input and provides the rectified signal to a set of input capacitors 610-1-610-3.

The input capacitors 610-1-610-3 are connected in series with each other and the set of input capacitors 610-1-610-3 are arranged in parallel with the rectifier unit 607. The primary stage 601 also includes a sequence of power converters 630-1-630-3. Although the primary stage 601 is illustrated as having three power converters, other numbers of power converters can also be used, such as two, five, ten, etc. The power converters 630-1-630-3 are each arranged as full-wave power converters having two pairs of MOSFET switches, similar to the power converters 230 of FIG. 2.

In addition, the primary stage 601 includes an input capacitor 610 for each power converter 630 and a flying capacitor 640 connected between each pair of sequential power converters 630, similar to that of the power conversion unit 200 of FIG. 2. In particular, the primary stage 601 includes an input capacitor 610-1 for power converter 630-1, an input capacitor 610-2 for power converter 630-2, and an input capacitor 610-3 for power converter 630-3. The primary stage 601 also includes a flying capacitor 640-1 connected between the power converters 630-1 and 630-2 and a flying capacitor 640-2 connected between the power converters 630-2 and 630-3. In this arrangement, a controller (not shown) can operate the switches of power converters 630 such that the flying capacitors 640 balance the voltages on the input capacitors 610, as described above with reference to FIG. 2.

Each power converters 630 converts a portion of the rectified signal (e.g., a portion stored by its corresponding input capacitor 610) and provides the converted portion of the signal to a primary winding of a transformer 650 of the transformer stage 602. For example, each power converter 630 may increase the frequency of the rectified signal for transformers 650, as shown by the first and second waveforms displayed along the bottom of FIG. 6. For example, switching of the power converter's switches can increase the frequency of the signal across the transformers 650 by a factor of about 30, 50, 100, 150, or 200 (e.g., to 10 kHz), or a factor in the range between any of those values (e.g., a factor between 100 and 200). The higher frequency may be in the range of 1 kHz to 100 kHz, or more specifically, in ranges of 1 kHz to 5 kHz, 1 kHz to 10 kHz, 5 kHz to 10 kHz, 10 kHz to 25 kHz, or 25-50 kHz. The power converters 630 may also adjust the voltage level of the rectified signal.

The transformer stage 602 can include a transformer for each power converter 630. For example, the transformer stage 602 includes a transformer 650-1 for the power converter 630-1, a transformer 650-2 for power converter 630-2, and a transformer 650-3 for the power converter 630-3. In addition, each transformer 650 can share a same or common magnetic core 655. In some implementations, each transformer has an independent core.

The transformers 650 can adjust the voltage level of the signal output by the power converters or leave the voltage levels substantially unchanged. For example, as shown by the second and third waveforms displayed along the bottom of FIG. 6, the transformers 650 can step down or decrease the voltage level. In some implementations, the transformers 650 may step up or increase the voltage level, as the implementations may warrant.

In the secondary stage 603, the secondary winding of each transformer 650 provides the lower voltage signal to a secondary rectifier unit 661. In particular, the secondary winding of the transformer 661-1 provides a lower voltage signal to a secondary rectifier unit 661-1; the secondary winding of the transformer 661-2 provides a lower voltage signal to a secondary rectifier unit 661-2; and the secondary winding of the transformer 661-3 provides a lower voltage signal to a secondary rectifier unit 661-3. Each secondary rectifier unit 661 includes diodes arranged as a full-wave rectifier. In other implementations, each rectifier unit 661 may include one or more diodes arranged as a half-wave rectifier.

Each secondary rectifier unit 661 rectifies its lower voltage signal into a rectified signal, as shown in the fourth waveforms displayed at the bottom of FIG. 6. The rectified signal from each second rectifier unit 661 is provided to a power factor correction ("PFC") unit that includes an inductor 662 and a MOSFET switch 664. Each PFC unit transforms its received rectified signal into a DC signal. The PFC unit makes its PFC input current in phase with the rectified voltage. The secondary side PFC unit makes the input AC side power factor corrected. In the illustrated implementation, the PFC unit is arranged as a boost converter.

To illustrate the operation of the PFC units, consider the PFC unit that includes the inductor 662-1 and the MOSFET switch 664-1. The inductor 662-1 may be monitored to control the switching of the MOSFET switch 664-1 to provide power factor correction and output voltage regulation across capacitor 668. Specifically, the inductor 662-1 acts as an energy storage device by being energized for a particular fraction of the power factor corrections unit's switching cycle, and de-energized for the remainder of the cycle. The level of energy transfer determines the input-to-output voltage ratio for the stage, which allows the power supply 605 to provide accurate voltage control.

Such switching is achieved in this example by the MOSFET switch 664-1. The MOSFET switch 664-1 may take a number of forms (and could be MOSFET, IGBT, or other appropriate type of switch). The MOSFET switch 664-1 is switched on and off as appropriate so as to permit current flow between the arms of the power factor correction unit so as to produce a properly regulated voltage output as a determined voltage level.

The MOSFET switch 664-1 can be controlled in an integrated manner by an IC controller (not shown) of various types, such as the Fairchild FAN series of active power factor correction controllers, available from Fairchild Semiconductor Corporation (San Jose, Calif.). Various other controllers, such as microcontrollers, may also be used to control the MOSFET switch 664-1. The ratio of on time to off time for the MOSFET switch 664-1 results in appropriate control of the voltage and current level. The other PFC units (e.g., inductor 662-2 and MOSFET switch 664-2, and inductor 662-3 and MOSFET switch 664-3) can operate in the same manner. The outputs of each PFC unit are combined at terminal 670 to form an output signal for a load.

In operation, AC power enters the power supply 605 from a power line. The power is rectified by the rectifier unit 607 and divided between the power converters 630-1-630-3 by way of the input capacitors 610-1-610-3. The voltage levels of the input capacitors 610-1-610-3 are balanced by switching the flying capacitors 640-1 and 640-2 between their two positions, as described above with reference to FIG. 2. Each power converter 630-1-630-3 increases the frequency of its portion of the rectified signal (or performs some other power conversion) and provides its portion of the converted power to a transformer 650-1-650-3 of the transformer stage 602. The transformers 650 may adjust the voltage level of each portion of the converted power, or leave the voltage levels substantially unchanged.

Each portion of the converted power then leaves the transformer stage 602 and enters the secondary stage 603, where rectifier units 661-1-661-3 replace the negative portion of the AC signal with a mirror-image (or near mirror-image) positive portion. The power passes out through the diodes 663-1-663-3 from the power factor correction units, but is modulated by the high-speed switching of the MOSFET switches 664-1-664-3 operated according to the relevant controller that is programmed as to maintain a consistent and controlled voltage flowing out of the power conversion unit 600. The power output by the diodes 663-1-663-3 is combined at terminal 670 and further smoothed by a capacitor 668 to produce at terminals 670 and 672 a DC output that is suitable for a load.

In some implementations, the power conversion unit 600 may process three-phase AC power. Such processing may occur constantly and in parallel for the three phases of the power, and the outputs from the portions of the power supply that serve each phase can be combined and provided at terminal 670, while the other outputs are connected to terminal 672 and to a common earth ground.

In this manner, the power conversion unit 600 as described can provide a highly regulated supply of power at a controlled voltage, and provide power factor correction by way of circuitry that is in a relatively low voltage stage rather than a higher voltage stage—where low voltage may be about 480 volts or below, 400 volts or below, or 240 volts or below (e.g., between about 0 volts and about 480 volts, where variability may be created by transients and other common factors in an electric generation system). The power conversion unit 600 can also use power converters and other components rated for, or otherwise suitable for, low voltages (e.g., below about 1 KV) to convert and regulate input power that is of a higher voltage, such as medium voltages (e.g., between about 1 KV and 35 KV).

In this example, the output power may be at a voltage level of about 48V or about 12V, or another level usable by electric loads that are connected to the power conversion unit 600. The primary stage may be KV in size, such as about 10 KV to about 50 KV. The power factor correction may, in some implementations, be carried out by a boost converter, and the power converters 630 may take a variety of forms, such as bi-directional, uni-directional, full-bridge, half-bridge, among other things. The secondary stage 603 may achieve power factor correction by way of a MOSFET switch for synchronized electrification, which may provide higher efficiency to a related set-up that uses a diode for the PFC unit.

Figure 7:
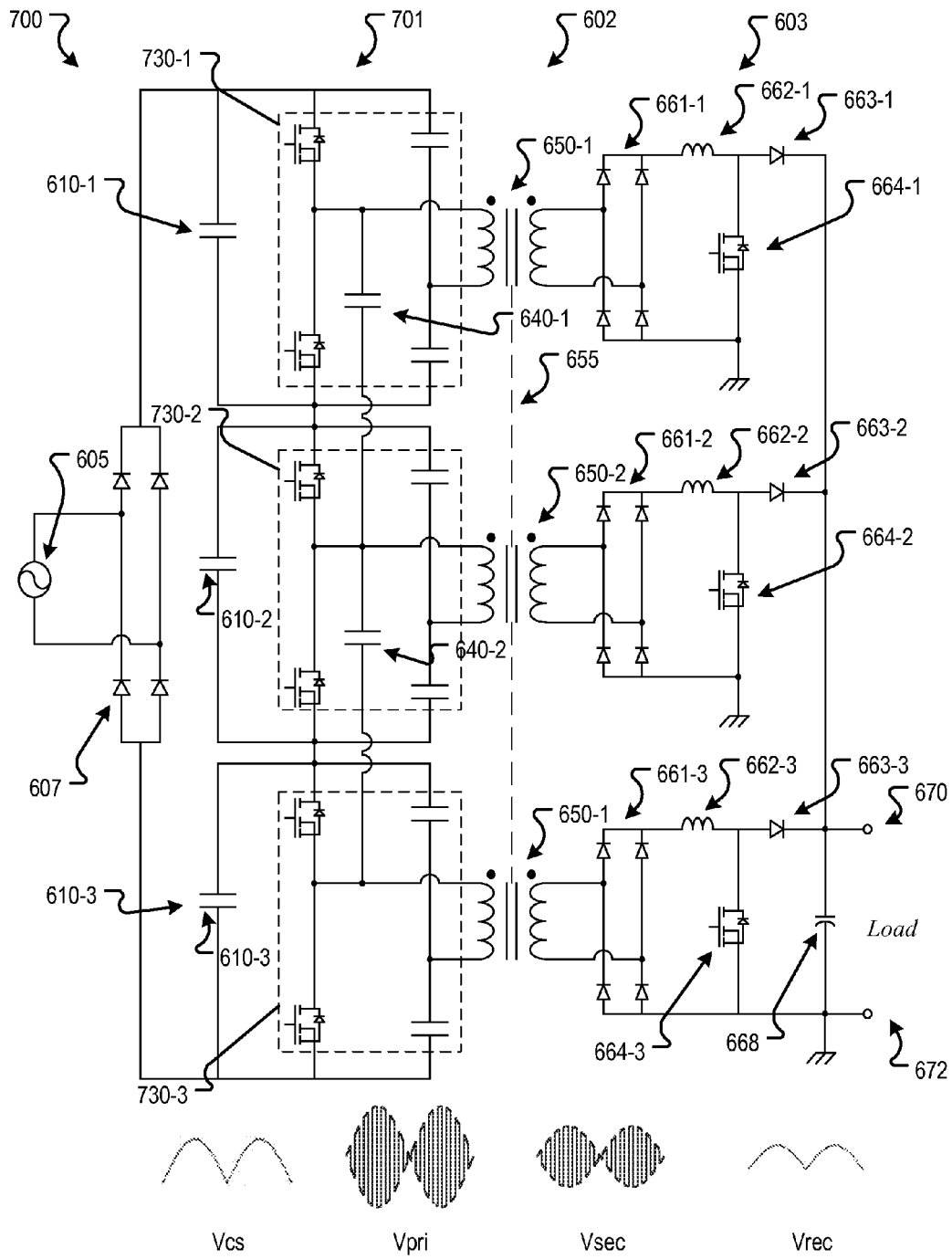
FIG. 7 is a schematic diagram of another power conversion unit having power converters arranged in a sequence, capacitors for balancing input voltage to the power converters, transformers connected to outputs of the power converters, and rectifiers connected to the secondary side of the transformers.

FIG. 7 is a schematic diagram of another example power conversion unit 700. The example power conversion unit 700 is similar to the power conversion unit 600 of FIG. 6 and includes many of the same circuit elements of the power conversion unit 600 of FIG. 6. For example, the power conversion unit 700 includes a transformer stage 602 and a secondary stage 603 that may be the same as, or similar to, the corresponding stages of the power conversion unit 600. However, power conversion unit 700 includes a primary stage 701 that differs from the primary stage 601 of the power conversion unit 600.

In particular, the power conversion unit 700 includes half-bridge power converters 730-1-730-3, rather than full-wave power converters 630. The half-wave power converters 730-1-730-3 are similar to the half-wave power converters 330-1-330-3 of FIG. 3. Specifically, each power converter 730-1-730-3 includes a pair of MOSFET switches (or IGBT or other appropriate switches) that are used to switch the position of flying capacitors 640-1 and 640-1 and to increase the frequency for transformers 650. Each power converter 730-1-730-3 also includes a pair of capacitors. The example power conversion unit 700 operates in a similar manner as the power conversion unit 600 to provide a suitable DC output for a load. However, the use of half-bridge power converters 730 provides a balance between efficiency and component cost.

Figure 8:
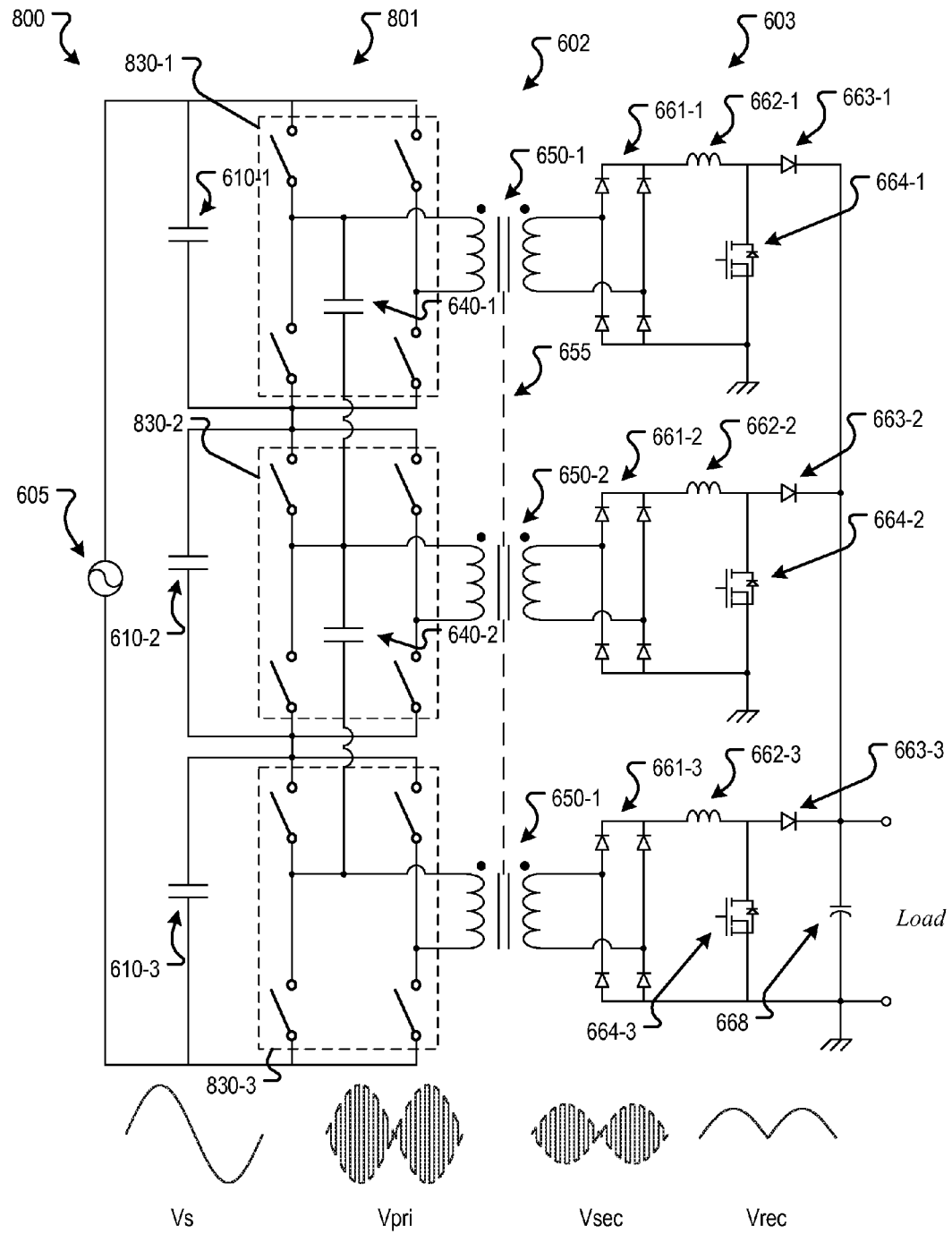
FIG. 8 is a schematic diagram of another power conversion unit having power converters arranged in a sequence, capacitors for balancing input voltage to the power converters, transformers connected to outputs of the power converters, and rectifiers connected to the secondary side of the transformers.

FIG. 8 is a schematic diagram of another example power conversion unit 800. The example power conversion unit 800 is similar to the power conversion unit 600 of FIG. 6 and includes many of the same (or similar) circuit elements of the power conversion unit 600 of FIG. 6. For example, the power conversion unit 800 includes a transformer stage 602 and a secondary stage 603 that may be the same as, or similar to, the corresponding stages of the power conversion unit 600. However, power conversion unit 800 includes a primary stage 801 that differs from the primary stage 601 of the power conversion unit 600.

In particular, the primary stage 801 includes full-wave power converters 830-1-830-3 that are arranged using two pairs of bi-directional switches, similar to that of the power converters 430 of FIG. 4. In addition, the primary stage 801 does not include a rectifier unit 607. Thus, the power converters 830-1-830-3 convert an AC signal rather than a rectified signal as shown in the first two waveforms displayed at the bottom of FIG. 8. As shown in the first two waveforms, the power converters 830-1-830-3 can increase the frequency of the AC signal and pass the higher frequency signal to the transformer stage 602. The transformer stage 602 and the secondary stage can process the higher frequency signal to produce a DC output suitable for a load, as described above with reference to FIG. 6.

Figure 9:
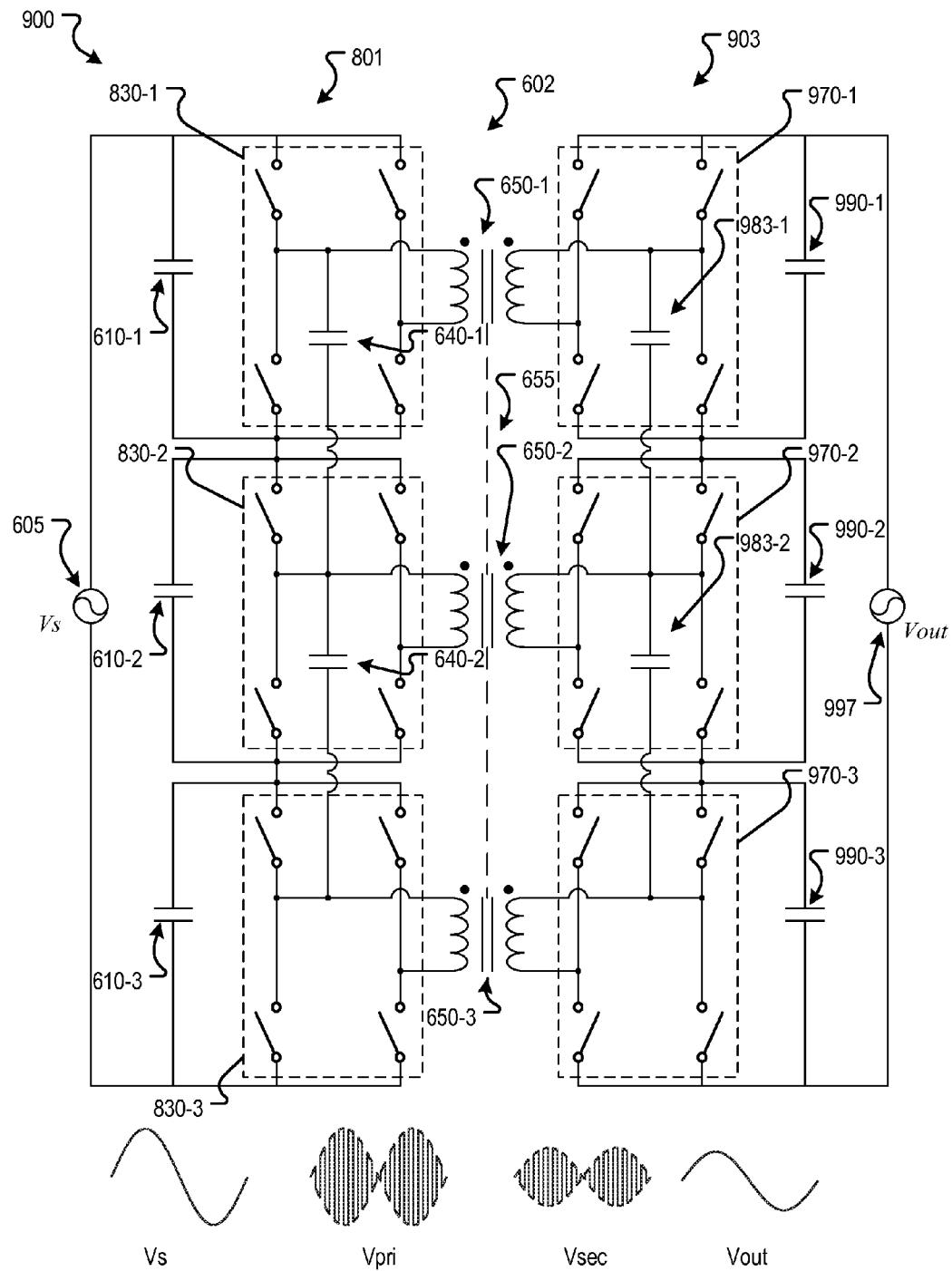
FIG. 9 is a schematic diagram of a power conversion unit having a first set of power converters arranged in a sequence, capacitors for balancing input voltage to the first set of power converters, transformers connected to outputs of the power converters, and a second set of power converters connected to the secondary side of the transformers.

FIG. 9 is a schematic diagram of another example power conversion unit 900. The example power conversion unit 900 includes many of the same (or similar) circuit elements of the power conversion unit 800 of FIG. 8. For example, the power conversion unit 800 includes a primary stage 801 and a transformer stage 602 that may be the same as, or similar to, the corresponding stages of the power conversion unit 800. However, the power conversion unit 900 includes a secondary stage 903 that includes power converters 970-1-970-3 arranged in a sequence, rather than rectifiers and PFC units of FIG. 8.

In the illustrated implementation, the secondary stage 903 includes a secondary stage power converter 970 for each primary stage power converter 930. In particular, the secondary stage 903 includes a secondary stage power converter 970-1 that is connected to the secondary winding of the transformer 650-1. In turn, the primary winding of the transformer 650-1 is connected to the primary stage power converter 830-1. Similarly, the transformer 650-2 is connected to the primary stage power converter 830-2 and the secondary stage power converter 970-2; and the transformer 650-3 is connected to the primary stage power converter 830-3 and the secondary stage power converter 970-3.

The secondary stage 903 also includes an output capacitor 990 for each secondary stage power converter 970 and a flying capacitor 983 connected between each sequential pair of power converters 970. The secondary stage 903 works in reverse of the primary stage 801 to rebuild an AC output signal 997 for use by a load, as shown in the third and fourth waveforms displayed at the bottom of FIG. 9. In addition, the flying capacitors 983-1 and 983-2 are used to balance the output voltages on the output capacitors 990-1-990-3 to protect the power converters 970-1-970-3, in a similar manner as the primary stage capacitors.

In some implementations, the number of power converters 830 included in the primary stage may not equal the number of power converters 970 of the secondary stage. For example, the transformers 650 may lower the voltage present on the secondary windings and thus on the secondary stage 903 of the power conversion unit 900. In this example, a lower number of power converters 970 may be used in the secondary stage 903 as the lower voltage can be divided between a smaller number of power converters 970. To reduce the number of power converters 970 of the secondary stage 903, a set of primary windings for each primary stage power converter 830-1-830-3 may be wrapped around a common magnetic core 655. In addition, a set of secondary windings may be wrapped around the core 655 for each secondary stage power converter 970. If the number of secondary stage power converters 970 is less than the number of primary stage power converters 830, the number of sets of secondary windings may be less than the number of sets of primary windings.

In some implementations, the number of secondary stage power converters 970 may be reduced using an equal number of sets of primary windings and sets of secondary windings. For example, if there are three primary stage power converters 830 and a single secondary stage power converter 970, three sets of secondary windings may be connected in parallel to provide input power to the secondary stage power converter 970.

The number of secondary stage power converters 970 can also be larger than the number of primary stage power converters 830. For example, the transformer stage 602 may increase the voltage level such that the voltage level of the secondary stage 903 is higher than the voltage level of the primary stage 801. In this example, more secondary power converters 970 may be used to handle the higher voltage level. To increase the number of secondary stage power converters 970 relative to the number of primary stage power converters 830, the common magnetic core 655 may include a larger number of sets of secondary windings than the number of sets of primary windings.

The power conversion unit 900 can also support bi-directional power flow. For example, the power may flow from the secondary stage 903 (e.g., the output voltage 997 may be an input voltage) to the primary stage 801 (e.g., to produce an output voltage at 605).

Figure 10:
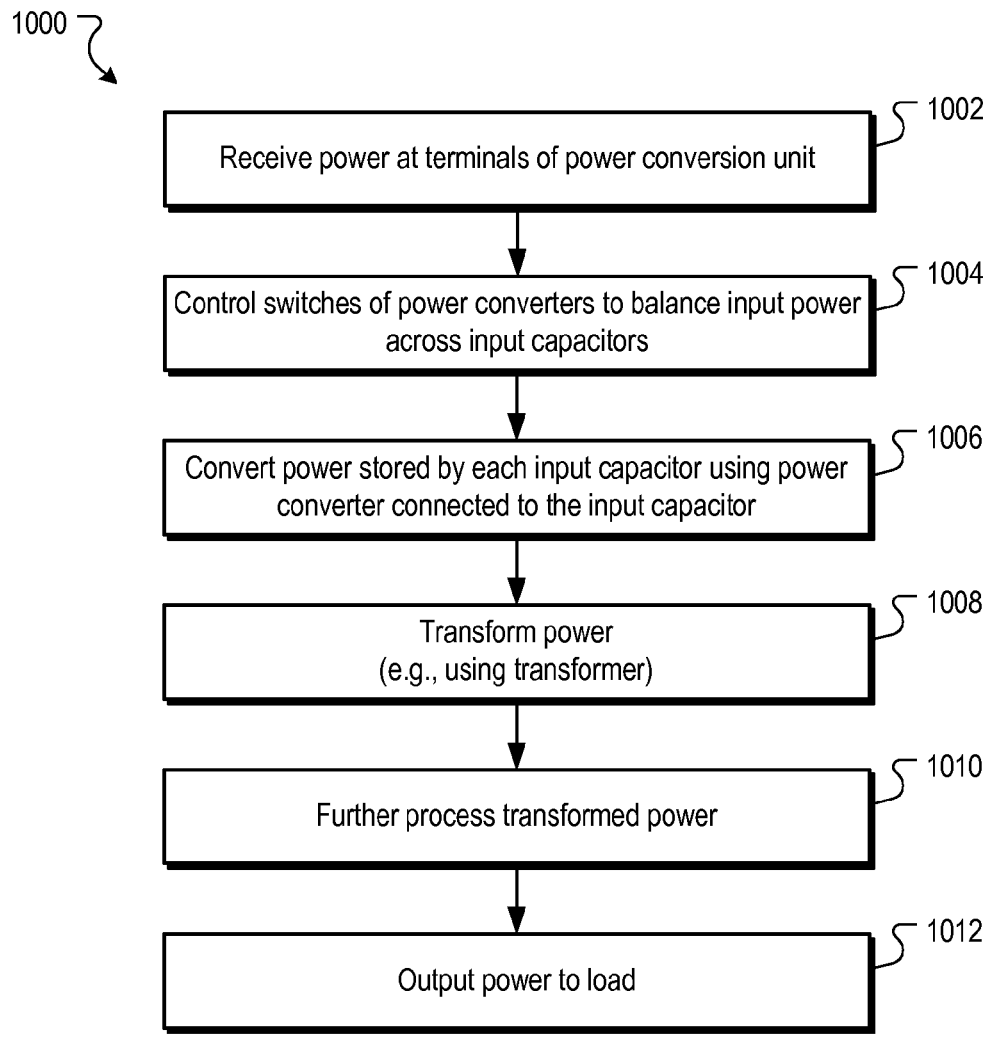
FIG. 10 is a flow chart of an example process for converting input power to power suitable for a load.

FIG. 10 is a flow chart of an example process 1000 for converting input power to power suitable for a load. In general, the process involves balancing input voltages for a sequence of power converters, where each power converter has a corresponding input capacitor that stores a portion of the input power for the power converter to convert. Each power converter converts (e.g., adjusts the voltage level or frequency) of a portion of the total input voltage such that the power converters, as a group, can convert voltages that are higher than the rated voltage for each power converter. Transformers can receive the converted portions of the power and provide it to auxiliary circuit elements that further condition the power for a load. The process 1000 may be performed either in whole or in part by apparatuses like those shown and discussed above with respect to FIGS. 1-9.

The process begins at box 1002, where power is received at terminals of a power conversion unit. The power may be DC power (e.g., rectified DC power) or AC power. For example AC power may be received at a medium voltage level (e.g., (between about 1 KV and about 35 KV), and at, for example 60 Hz or other standard distribution frequency and voltage for medium voltage power for the jurisdiction in when the system operates. For DC applications, the received medium voltage power may be rectified, for example, using a full-wave rectifier unit before being provided to input capacitors for power converters. For AC applications, the medium voltage input power may be provided to the input capacitors for the power converters.

At box 1004, switches of the power converters are controlled to balance the voltage level of the input capacitors. For example, a controller may switch the switches of the power converters between two positions such that the input capacitor with which flying capacitors are in parallel changes according to a pre-determined duty cycle, such as 50%. For example, a switching process may be the same as, or substantially similar, to the switching process described above with reference to FIG. 2.

At box 1006, each power converter converts the portion of the input power stored by its corresponding input capacitor. For example, each power converter may increase the frequency for the transformers and/or adjust the voltage level of the input power. Each power converter then provides its portion of the power to a transformer of a transformation stage.

At box 1008, the converted power is transformed, for example, to a different voltage level. The transformation by each transformer may occur in standard manners, by a primary phase having a particular number of windings, and one or more secondary phases having corresponding different numbers of windings.

At box 1010, the transformed power is further processed. For DC power applications, the transformed power may be processed by a rectifier unit, power factor correction unit, and/or a boost converter to generate a suitable DC power output for a load. For AC power applications, the transformed power may be voltage balanced for two or more power converters that convert the transformed signal into an AC signal that is suitable for a load.

At box 1012, the processed power is provided for use by one or more electric loads. Such power may be provided by way of a pair of terminals, where one terminal may be at the regulated voltage with DC or AC power, and the other terminal may be tied to ground.

Each of the power conversion units described herein can support single phase or three phase power configurations. The power conversion units can also allow for bi-directional power flow. In addition, the power converters of the power conversion units can operate as voltage sources and/or current sources.

The use of the term "terminals" is intended here to cover a variety of connections, including hardwired connects to the load, so that separate conductive pads with connectors are not required. The load in this example may typically include one or more bays and/or racks of computer servers for installation in a computer data center. For example, a bay may include approximately 30 trays that each hold one or more motherboards that may each in turn have mounted to them a plurality of microprocessors and associated chips (e.g., controllers, RAM, etc.), where each microprocessor may include a plurality of computing cores. The bay may also have mounted to it networking components for providing communications between the trays in the bay and between the bay and other bays, and between the bay and a central system. Each of these components may demand and use power provided by the converter via the process just discussed. Other bays in the data center may be served in similar manners from other power converters that operate in the same manner discussed here. Also, controllers for providing power factor in the processes operated for each converter may be coordinated so as to provide more stable power factor correction, to reduce the cost and complexity of the control (e.g., by having a single control chip or device controller a plurality of different power factor correction circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular implementations of the subject matter have been described. Many other implementations other than those described may be employed, and may be encompassed by the following claims.

What is claimed is:

1. A power conversion unit, comprising:
   two or more power converters arranged sequentially to each other to convert input power provided at an input of the power conversion unit to an output power, each power converter comprising a set of first switches and a set of second switches;
   a set of first capacitors arranged in series with each other and including for each power converter a first capacitor that is arranged in parallel with an associated power converter and being arranged to store a portion of the input power, each first capacitor being electrically coupled to an input of the associated power converter;
   a set of second capacitors arranged in series with each other and including a second capacitor connected between an output of each pair of sequential power converters in the sequence, each particular second capacitor of the set of second capacitors being arranged to balance the portion of the input power stored by a particular pair of the first capacitors by sequentially alternating between a first position and a second position, wherein:
   the set of first switches of a first power converter of a particular pair of sequential power converters are arranged to switch the second capacitor connected between the particular pair of power converters between the first position and the second position;
   in the first position, the second capacitor is in parallel with the first capacitor for the first power converter of the particular pair of sequential power converters;
   in the second position, the second capacitor is in parallel with the first capacitor for a second power converter of the particular pair of sequential power converters; and
   the set of first switches and the set of second switches of each power converter are selectively switched to convert the portion of the input power stored by the first capacitor for the power converter to a portion of the output power.

2. The power conversion unit of claim 1, wherein each power converter is arranged to convert the portion of the input power stored by the first capacitor for the power converter into a portion of the output power.

3. The power conversion unit of claim 1, further comprising a controller arranged to adjust the set of first switches and the set of second switches of the first power converter such that the second capacitor connected between the particular pair of power converters is switched from the first position to the second position at a particular frequency.

4. The power conversion unit of claim 1, wherein the set of first switches and the set of second switches comprise semiconductor switches.

5. The power conversion unit of claim 1, wherein each second capacitor is arranged as a flying capacitor.

6. The power conversion unit of claim 1, wherein the two or more power converters are arranged to convert the input power to output power by switching at a frequency higher than a frequency of the input power or adjusting a voltage level of the input power.

7. The power conversion unit of claim 1, wherein each power converter comprises a half-bridge or full-bridge power converter.

8. The power conversion unit of claim 1, further comprising a set of transformers, the set of transformers comprising a transformer that has an input that is electrically coupled to the output of each power converter.

9. The power conversion unit of claim 8, wherein particular transformers of the set of transformers share a same magnetic core.

10. The power conversion unit of claim 8, further comprising a set of power converters connected to the outputs of the transformers.

11. The power conversion unit of claim 10, wherein the number of power converters in the set of power converters does not equal the number of power converters of the two or more power converters.

12. The power conversion unit of claim 10, wherein the number of power converters in the set of power converters equals the number of power converters of the two or more power converters.

13. The power conversion unit of claim 1, wherein the portion of input power stored by each first capacitor is arranged to be balanced by open loop control or closed loop control.

14. The power conversion unit of claim 1, wherein the two or more power converters and the set of first capacitors include at least one redundant stage comprising a power converter and an additional first capacitor, the at least one redundant stage arranged to maintain, at each first capacitor, a balanced voltage that is less than a rated voltage for the power converters in response to a failure of at least one of the first capacitors or at least one of the power converters.

15. A method for converting power, comprising:
  storing, by a set of first capacitors that are arranged in series with each other, input power received from an input power source, each first capacitor storing a portion of the input power;
  converting the input power using two or more power converters arranged sequentially to each other, each power converter converting a portion of the input power stored by a corresponding first capacitor that is (i) arranged in parallel with the power converter and (ii) electrically coupled to an input of the power converter, each power converter comprising a set of first switches and a set of second switches; and
  balancing, by a set of second capacitors arranged in series with each other, the portion of the input power stored by each first capacitor, each particular second capacitor of the set of second capacitors balancing the portion of the input power stored by a particular pair of first capacitors by sequentially alternating between a first position and a second position, wherein:
    the set of first switches of a first power converter of a particular pair of sequential power converters switch the second capacitor connected between the particular pair of power converters between the first position and the second position;
    in the first position, the second capacitor is in parallel with the first capacitor for the first power converter of the particular pair of sequential power converters;
    in the second position, the second capacitor is in parallel with the first capacitor for a second power converter of the particular pair of sequential power converters; and
  selectively switching the set of first switches and the set of second switches of each power converter to convert the portion of the input power stored by the first capacitor for the power converter to a portion of the output power.

16. The method of claim 15, further comprising transforming converted power output by each power converter using a set of transformers, each transformer of the set of transformers including a common magnetic core.

17. The method of claim 15, wherein each power converter adjusts a voltage of a portion of the input power and adjusts an operational frequency of an isolation transformer.

* * * * *